June 7, 1966 D. R. TOMPKINS ETAL 3,255,381
PROTECTIVE CIRCUITRY FOR SURGE GENERATORS
Filed Nov. 20, 1963
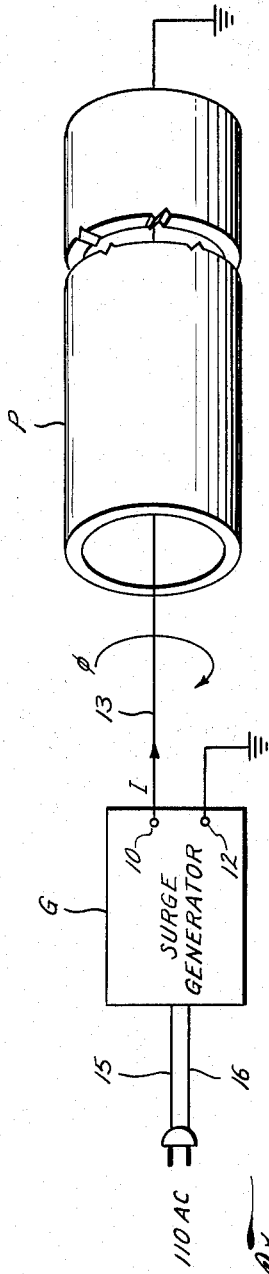
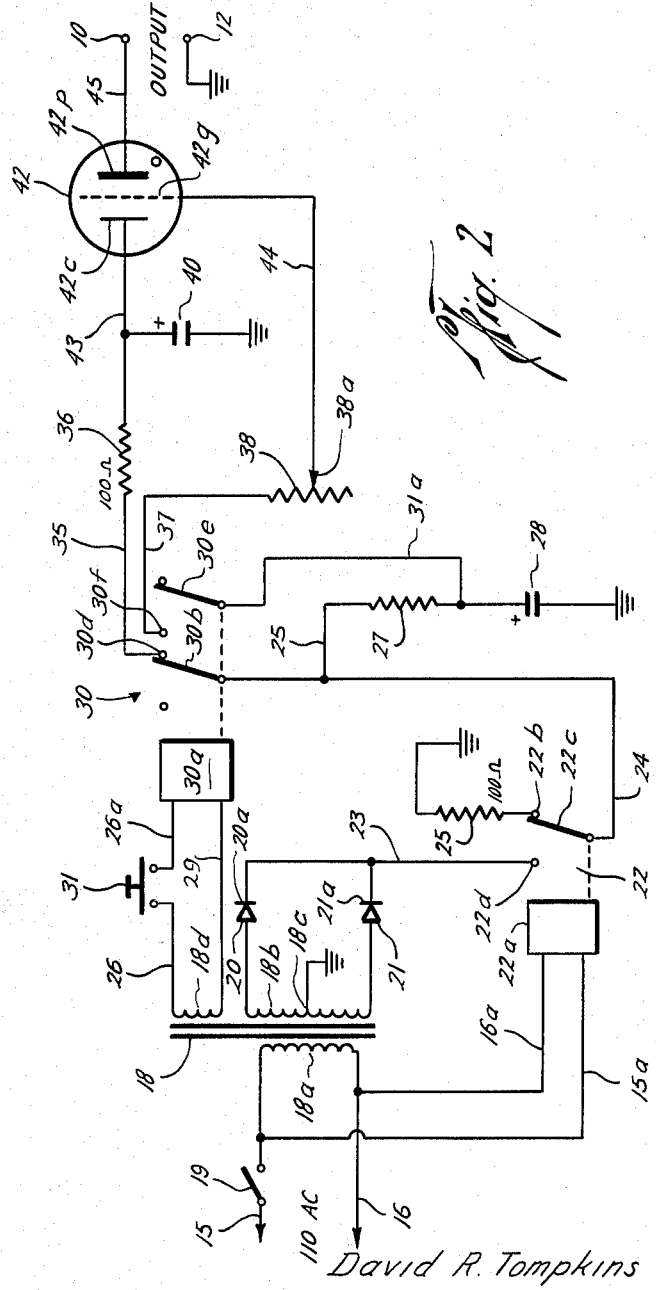
David R. Tompkins
Lemuel L. Council
Charles P. Calhoun
INVENTORS
BY Hayden & Pravel
ATTORNEYS

United States Patent Office 3,255,381
Patented June 7, 1966

1

3,255,381
PROTECTIVE CIRCUITRY FOR SURGE
GENERATORS
David R. Tompkins, Lemuel L. Council, and Charles P. Calhoun, Houston, Tex., assignors to Plastic Applicators, Inc., a corporation of Texas
Filed Nov. 20, 1963, Ser. No. 325,064
5 Claims. (Cl. 317—9)

This invention relates to improvements in a surge generator, and more particularly to a surge generator for use in forming residual, circumferential magnetic flux concentrated near the inner wall of a tubular, ferromagnetic member to be inspected.

Magnetic inspection detects flaws, voids, or other anomalies in the wall structure of pipe by detecting disturbances caused by such anomalies in a magnetic field concentrated in the wall of the pipe or adjacent thereto. The disturbance caused in a magnetic field by a flaw is maximized if the flaw intersects as many lines of magnetic flux of the magnetic field as possible; therefore, longitudinal flaws in a tubular member are more easily located if a magnetic field is placed in the wall of the tubular member extending circumferentially about the tubular member to perpendicularly intersect the longitudinal flaw. Tubular members and particularly oil field pipe and tubing suspected of having longitudinal flaws have been inspected in the past by forming a circumferential magnetic field in the wall of the member by conducting a current axially of the tubular member to form a magnetic flux field concentrated in the wall. Flux patterns of the proper amplitude were formed by conducting very large currents through the tubular member to form the appropriate magnetic field. Such currents have been in the range of several hundred amperes up to thousands of amperes. A particular drawback or disadvantage of such systems lies in the fact that an appreciable time is required to inspect for flaws in a typical tubular member so that the large current flows for a long period of time while the appropriate scanning or detecting equipment is passed over the outer surface of the tubular member.

Such large currents flowing through tubular members have been very objectionable to the owners of the tubular members in that the large currents cause harm or damage to the tubular members, and, further, the equipment required to create such a large continuous current is expensive and cumbersome.

Equipment was thereafter evolved which passed large currents through tubular members for a short period of time to create the required circumferential magnetic field about the conductor of the current to leave a residual, circumferential magnetic field in the tubular member. The intent in the use of such equipment was to eliminate the disadvantages inherent in equipment furnishing large, steady-state currents while at the same time obtaining a circumferential magnetic field in the wall of the structure of the specimen to be inspected so that it might be scanned or detected for longitudinal flaws. Such devices, however, have several disadvantages; among the disadvantages, the devices are cumbersome and heavy to the extent that field operations are materially handicapped and further, they utilize batteries which generate fumes and tend to boil over because of the heat generated in the batteries.

The equipment now used generates magnetic flux which is essentially uniform in density in the wall of the tubular member. The flaw detecting equipment is commonly moved over or adjacent the outer surface of the tubular member under inspection so that flaws near the outer surface of the tubular member are easily detected, but flaws near the inner surface of the member are difficult to detect because the disturbances in the magnetic field decrease with distance and sometimes are obscured by spurious indications caused by mill scale, rust, and other surface irregularities commonly found on pipe, tubing, and other metallic members. This invention provides means creating a residual, circumferential flux pattern in the wall of the tubular member which has a greater flux density at or near the inner surface of the tubular member than the flux density at or near the outer surface of the tubular member. Such a magnetic flux distribution tends to equalize the size of the magnetic flux pattern disturbances outside the pipe caused by longitudinal flaws regardless of their location in the wall of the tubular members.

An object of this invention is to provide a new and improved surge generator which provides a large pulse of current in a short period of time.

An important object of this inventon is to provide a new and improved surge generator which includes means protecting the input circuitry from overload.

A further object of this invention is to provide a new and improved surge generator which provides higher current intensities than battery powered generators.

Yet another object of this invention is to provide a new and improved surge generator having a protective relay which disconnects the source from the storage circuit to prevent overloading of the source.

Still another object of this invention is to provide a new and improved surge generator which fires an ignitron in the storage circuit to release stored electrical energy.

Still a further object of this invention is to provide a new and improved surge generator which automatically bleeds any accumulated charge to ground when the generator is de-energized.

Another object of this invention is to provide a new and improved surge generator for a magnetic pipe inspection system which generates a surge of current leaving residual magnetism concentrated in a pipe near the inner wall of the pipe so that flaws near the inner wall of the pipe are easily detected.

An important object of this invention is to provide a new and improved surge generator for use with a mobile pipe inspection system which is lightweight and compact and which generates little heat and no fumes.

Other objects and advantages of the present invention will become more readily apparent from a consideration of the following description and drawings wherein:

FIG. 1 is a schematic drawing of the invention and a pipe to be inspected; and

FIG. 2 is a schematic diagram of the circuitry of the invention.

In FIG. 1, the surge generator G is connected to a conventional alternating current source which preferably furnishes 110 volts at 60 cycles per second. The surge generator G has a pair of output terminals 10 and 12 across which a large, short pulse of current is formed. The terminal 12 may be grounded and the terminal 10 is preferably connected to a wire 13 which is passed through the interior of a pipe P to be inspected. The wire 13 is grounded after it has conducted the pulse of current through the pipe P to complete the circuit with the terminal 12.

Considering the invention more in detail, a pair of wires 15 and 16 are connected to the alternating current source and the primary 18a of a transformer 18. A switch 19 is placed in the lead 15 and operates to remove voltage from the primary 18a of the transformer 18 to turn the surge generator G off and on.

A secondary 18b is wound on the core of the transformer 18 and is provided with a grounded center tap 18c.

The end terminals of the winding 18b are connected to a pair of rectifiers 20 and 21 which have their cathodes 20a and 21a, respectively, connected together.

A wire 15a is connected to the input lead 15 and is connected to the armature porton 22a of a relay 22. The circuit is completed by connecting a wire 16a from the input wire 16 to the other side of the armature 22a of the relay 22. Thus, when the switch 19 is operated to apply power from the alternating current source to the transformer 18, voltage is likewise applied to the armature 22a of the relay 22 through the leads 15a and 16a.

Operation of the relay 22 by electrification of the armature 22a shifts the movable terminal 22c away from the terminal 22b and into contact with the terminal 22d. The terminal 22d is connected by a wire 23 to the cathode 20a and the cathode 21a of the previously mentioned rectifiers 20 and 21. Contact of the terminal 22c with the terminal 22d applies the voltage in the wire 23 to a wire 24 which is connected to the terminal 22c. Conversely, such movement of the terminal 22c away from the terminal 22b disconnects the wire 24 from a resistor 25 which is connected to the terminal 22d and to ground.

As it may be seen from the foregoing, connection of the leads 15 and 16 of the generator G to an alternating current source and actuation of the switch 19 to apply voltage to the transformer 18 applies rectified voltage through the wire 23 and relay 22 to the wire 24. Specifically, when either end of the secondary winding 18b becomes positive with respect to the other end of that winding, the appropriate rectifier will be biased in the conducting direction and current will flow from the secondary winding 18b though the attached rectifier to the wire 23. Since an alternating current is preferably applied to the transformer 18, first one end of the secondary winding 18b and then the opposite end of the secondary winding 18b is made positive with respect to the other. The diode rectifiers 20 and 21, in response to the alternating current applied to the transformer 18, forms a pulsating unidirectional current in the wire 23.

The unidirectional current flowing in the wire 23 and in the wire 24 is conducted through a wire 25 to a resistor 27 and then to a capacitor 28. The opposite side of the capacitor 28 is grounded so that the plates of the capacitor 28 connected to the resistor 27 tend to be charged to the voltage of the unidirectional current flowing through the resistor 27.

An additional secondary 18d is wound on the core of the transformer 18 and is connected to a pair of wires 26 and 29. The wire 29 is connected to the armature 30a of a relay 30 and the wire 26 is connected to one side of a pushbutton switch 31. The other side of the pushbutton switch 31 is connected to a wire 26a which then connects to the armature 30a of the relay 30. The voltage induced in the secondary 18d of the transformer 18 is applied to the armature 30a of the relay 30 when the pushbutton 31 is operated to connect the wires 26 and 26a together. When the relay 30 does operate, a terminal 30b is attracted toward the armature 30a and away from a terminal 30d. An additional movable terminal 30e is likewise attracted toward an additional terminal 30f. The wire 24 is connected to the terminal 30b, and the additional movable terminal 30e is connected to a wire 31a which connects to the resistor 27 and the capacitor 28. Thus, actuation of the pushbutton 31 disconnects the wire 24 from the terminal 30d and connects the wire 31a to the terminal 30f.

The terminal 30d is connected to a wire 35 which then connects to a resistor 36 and the terminal 30f is connected to a wire 37 which then connects to a resistor 38. The opposite side of a resistor 36 is connected to the positive plates of a capacitor 40 which has the negative plate grounded. A mercury filled ignitron 42 has its cathode 42c connected to a wire 43 which then connects to the positive plate of the capacitor 40. A control grid 42g of the ignitron 42 is connected to a wire 44 which is connected to a movable contact 38a of the resistor 38 which is preferably a variable resistor. A plate terminal 42p of the ignitron 42 is connected to a wire 45 which then connects to the output terminal 10; the output terminal 12 is grounded.

When the relay 30 is in the unoperated or illustrated position, the unidirectional current flowing through the conductor 24 to the terminal 30b is conducted through the terminal 30d, the wire 35, and the resistor 36 to the positive plate of the capacitor 40. Such current flow tends to charge the capacitor 40 through the resistor 36 to the voltage level of the cathodes 20a and 21a of the rectifiers 20 and 21, respectively. As previously mentioned, current flow through the conductor 24 to the conductor 25 and the resistor 27 tends to charge the capacitor 28 to the same voltage level. The voltage on the capacitor 28 is connected by the wire 31a to the terminal 30e which, when the relay 30 is unoperated, is not connected to any additional circuitry. When the pushbutton 31 is actuated to apply voltage through the wires 26a and 29 to the armature 30a of the relay 30, the terminals 30b and 30e are moved from the illustrated position as long as the pushbutton 31 is actuated. Such operation of the relay 30 breaks the circuitry including the wires 24 and 35 which charges the capacitor 40. At the same time, the charged capacitor 28 is connected through the wire 31a and the terminal 30e to the terminal 30f which conducts the voltage to the variable resistor 38 through the wire 37. The terminal 38a of the resistor 38 is adjusted to some voltage which is conducted through the wire 44 to the grid 42g of the ignitron 42. Since the charge accumulated on the plates of the capacitor 28 is positive, a positive voltage is applied to the grid 42g of the ignitron 42 to trigger or initiate conduction in the tube 42. Those skilled in the art will recognize the fact that the ignitron remains cut off until the proper voltage is applied to the grid 42g at which instant the mercury vapor in the tube 42 will ionize to allow very large conduction between the tube elements 42c and 42p to form a large pulse of current in the wire 45. The large current conducted by the ignitron 42, while it would commonly cause a large drop in terminal voltage of most sources, discharges only the plates of the capacitor 40 to the terminal 10 to form a large output pulse without dropping voltage at the source.

The large current discharged through the ignitron 42 rises rapidly to a peak and decays from the peak value so that the current is changing at every instant. The changing current flowing in the conductor 13 creates a circumferential magnetic field about the wire 13 which reaches a peak concentration in the pipe P and collapses soon thereafter. The varying magnetic lines of flux created by the surge of current cut or pass through incremental portions of the pipe P to induce a voltage resulting in the flow of currents in the pipe P. The currents flowing in the wall of the pipe P are classed as eddy currents and they form their own magnetic fields as they flow in the wall of the pipe. The eddy currents form their own magnetic fields which oppose the magnetic field formed by the inspection system to reduce the strength of the magnetic field in the wall of the pipe P. Since the unoccupied space adjacent the inner wall of the pipe cannot support eddy currents, the flux distributed at and just beneath the inner surface of the pipe P is maximum in strength. The maximum flux at or near the inner surface generates maximum eddy currents which reduce the flux near the central portions of the wall of the pipe so that the net effect is a reduction of the flux strength progressing toward the outer surface of the pipe P.

As previously mentioned, the magnetic field disturbances created by a given flaw decrease with distance from the flaw so that flaws located near the inner surface of the pipe P are obscured by surface imperfections on the outer surface when scanning or detecting equipment is passed through the magnetic field at the outer surface of the pipe. The magnetic field in the pipe P induced by this invention is distributed in the pipe P so that flaws of equal size create equal magnetic field disturbances about the pipe P regardless of their location.

Considering the invention in operation, the leads 15 and 16 are connected to some alternating current source and switch 19 is closed. Closure of the switch 19 operates the relay 22 to shift the terminal 22c to contact the terminal 22d. Such contact of the terminal 22c with the terminal 22d provides a conducting path through which the rectifiers 20 and 21 may flow a unidirectional current to the wire 24 and thence to the relay terminal 30b. The unidirectional current continues to flow through the terminal 30d to the plate of the capacitor 40 to accumulate a large charge on the capacitor which is preferably several hundred or even several thousand microfarads in size. The charge is allowed to accumulate on the capacitor 40 as long as the ignitron 42 is maintained in a nonconducting status. When an operator desires to apply a large pulse of current through the conductor 13 to create a magnetic field in the pipe P, the pushbutton 31 is actuated.

Actuation of the pushbutton 31 operates the relay 30 to disconnect the rectifying circuit comprising the secondary 18b of the transformer 18 and the rectifiers 20 and 21 from the capacitor 40. Disconnection of the rectifying circuitry protects such circuitry from the transient discharge caused when the ignitron 42 conducts so that load fluctuations are not experienced by the alternating current source, and further, heating in the transformer 18 and the rectifiers 20 and 21 is held to a minimum.

When the rectifying circuitry is disconnected from the charged capacitor 40, the charged capacitor 28 is simultaneously connected to the grid 42g of the ignitron 40. The capacitor 28 provides voltage for firing the ignitron 42 through the wire 31a, the terminals 30e, and 30f, the wire 37, the resistor 38, and the wire 44. Operation of the relay 30, as previously mentioned, raises the voltage on the grid 42g of the ignitron 42 to render the tube operative to conduct the large current from the capacitor 40 to the output terminal 10.

After the surge generator G has been operated any number of times to create large pulses of current, the switch 19 may be operated to disconnect the alternating current source from the surge generator G. The operator of the surge generator G is protected from accidental shock or electrocution by discharge of the accumulated charge on the capacitor 40 when the surge generator G is turned off at the switch 19. Operation of the switch 19 to remove alternating voltage from the transformer 18 also removes voltage from the armature 22a of the relay 22 to shift the terminal 22c into contact with the terminal 22b. The grounded resistor 25 is connected to the wire 24 through the terminals 22b and 22c. For purposes of illustration, it may be assumed that the capacitor 40 is charged to the maximum charge achieved just before the ignitron 42 is ignited to discharge the capacitor. A charge of that size on the capacitor 40 is quite dangerous and can be fatal to the operator of the surge generator G. A bleed path to ground through the resistor 36, the wire 35, the terminal 30d, the terminal 30b, and the wire 24 is formed on the release of the relay 22 to discharge the capacitor 40 in a few seconds, even if the capacitor 40 has several thousand microfarads of capacitance. The resistor 25 and the resistor 36 are preferably about 100 ohms each to prevent a damaging surge to ground when the surge generator G is turned off.

Certain alterations may be included in the invention without departing from the spirit thereof. For instance, the ignitron 42 may be replaced with a semiconductor device such as the silicon controlled rectifier. Also, automatic operation of the invention may be provided by actuating the pushbutton 31 mechanically or by a timed device. Operation of the pushbutton 31 may be timed with movement of the pipe P as it is positioned to receive the conductor 13 therethrough. Also, the rectifying circuitry including the transformer 18 and the rectifiers 20 and 21 may be altered to operate with a direct current source. A transistorized D.C to D.C power supply may be used in lieu of the aforementioned elements or a rotary D.C. to D.C. converter may be used. Many of the elements of the circuitry of the surge generator G may be paralleled to provide a heavy duty device. The capacitor 40 may include several different capacitors paralleled together and the same is true of other elements such as the multiterminaled conducting device 42.

Broadly, this invention relates to a surge generator for use with an inspection system for tubular, ferromagnetic goods.

What is claimed is:

1. Protective circuitry for a surge generator connected to a A.C. source comprising:
    (a) a rectifier for forming a unidirectional flow of current from an alternating current source,
    (b) a conductor connected to ground,
    (c) a capacitor for accumulating a charge from a flow of unidirectional current,
    (d) a first conductor connecting the rectifier to the capacitor,
    (e) means for limiting current flow through said first conductor,
    (f) an output terminal,
    (g) a gas tube connected to the capacitor and the output terminal,
    (h) circuit means for forming a signal rendering said gas tube conductive,
    (i) means for connecting the signal formed by said circuit means to said gas tube to form an output pulse at the output terminal,
    (j) means for disconnecting said rectifier from the capacitor when the gas tube forms an output pulse at the output terminal, and
    (k) means for connecting the grounded conductor to the capacitor when the alternating current source fails to furnish current to the rectifier.

2. Protective circuitry for a surge generator connected to an A.C. source comprising:
    (a) a rectifier circuit for forming a unidirectional flow of current from an alternating current source,
    (b) a capacitor for accumulating a charge from a flow of unidirectional current, said capacitor having a capacity in the range of several thousand microfarads,
    (c) a first conductor connecting the rectifier to the capacitor,
    (d) means for limiting current flow through said first conductor,
    (e) relay means interposed in the first conductor for interrupting current flow therethrough,
    (f) an output terminal,
    (g) a gas tube connected between the capacitor and the output terminal,
    (h) circuit means for forming a signal rendering said gas tube conductive,
    (i) second relay means for connecting the signal formed by said circuit means to said gas tube to form an output pulse at the output terminal,
    (j) means for simultaneously operating the relay means and second relay means to form the output pulse at the output terminal and to disconnect said rectifier from the capacitor, and
    (k) whereby the current flow through the gas tube is supplied by the capacitor and the rectifier circuit is protected from excessive current flow.

3. The structure set forth in claim 2 including:
    (a) a conductor connected to ground,
    (b) relay means connecting the conductor to the capacitor,
    (c) said relay means connected to the rectifier circuit to maintain the grounded conductor disconnected from the capacitor when current flows from the A.C. source to the rectifier circuit, and (d) said relay means connecting said grounded conductor to the capacitor when no current flows to the rectifier circuit whereby residual charge on the capacitor is bled to ground.

4. The structure set forth in claim 2 wherein the relay means and second relay means operate in synchronism in response to a single control means.

5. The structure set forth in claim 2 wherein the circuit means for forming a signal is maintained disconnected from the gas tube by the second relay means, and the connective circuitry communicating with the grid of the gas tube is noncapactive to avoid accumulation of a charge thereon and the resulting unintended discharge of the gas tube.

References Cited by the Examiner
UNITED STATES PATENTS

| | | | |
|---|---|---|---|
| 2,136,375 | 10/1938 | De Forest | 324—38 |
| 2,624,784 | 1/1953 | Davis | 317—142 |
| 2,871,337 | 1/1959 | Johnson et al | 219—113 |
| 3,182,228 | 5/1965 | Gambill et al. | 317—148.5 |

SAMUEL BERNSTEIN, *Primary Examiner.*

R. V. LUPO, *Assistant Examiner.*